(12) United States Patent
Sakamoto et al.

(10) Patent No.: US 9,187,294 B2
(45) Date of Patent: Nov. 17, 2015

(54) HYBRID CONSTRUCTION MACHINE AND METHOD FOR CONTROLLING THE SAME

(71) Applicant: Hitachi Construction Machinery Co., Ltd., Bunkyo-ku, Tokyo (JP)

(72) Inventors: Hiroshi Sakamoto, Tokyo (JP); Masatoshi Hoshino, Tokyo (JP); Shinji Ishihara, Tokyo (JP)

(73) Assignee: Hitachi Construction Machinery Co., Ltd., Tokyo (JP)

( * ) Notice: Subject to any disclaimer, the term of this patent is extended or adjusted under 35 U.S.C. 154(b) by 0 days.

(21) Appl. No.: 14/351,406

(22) PCT Filed: Oct. 12, 2012

(86) PCT No.: PCT/JP2012/076541
§ 371 (c)(1),
(2) Date: Apr. 11, 2014

(87) PCT Pub. No.: WO2013/054928
PCT Pub. Date: Apr. 18, 2013

(65) Prior Publication Data
US 2014/0277970 A1 Sep. 18, 2014

(30) Foreign Application Priority Data

Oct. 14, 2011 (JP) ................................. 2011-227246

(51) Int. Cl.
*B66C 13/18* (2006.01)
*E02F 9/12* (2006.01)
(Continued)

(52) U.S. Cl.
CPC . *B66C 13/18* (2013.01); *B60K 6/46* (2013.01); *B60K 6/485* (2013.01); *B66C 23/84* (2013.01);
(Continued)

(58) Field of Classification Search
CPC .... A01B 63/00; A01B 63/002; A01B 63/004; A01B 63/006; A01B 63/008; A01B 63/02; A01B 63/023; A01B 63/026; A01B 63/10; A01B 63/1006; A01B 63/1013; B60K 6/28; B60K 6/30; B60K 6/46; B60K 6/485; B66C 13/18; B66C 23/84; B60L 11/00; B60L 11/1875; B60W 2300/17; B60W 2300/50; B60Y 2200/14; B60Y 2200/40; B60Y 2200/41; B60Y 2200/411; B60Y 2200/412; B60Y 2200/413; B60Y 2200/414; B60Y 2200/415; B60Y 2200/416; B60Y 2200/417; E02F 9/123; E02F 9/20; E02F 9/2075; E02F 9/2091; E02F 9/2095; Y02T 10/646; Y02T 10/647; Y02T 10/648; Y02T 10/649; Y02T 10/6217; Y02T 10/6226; Y02T 10/6286
See application file for complete search history.

(56) References Cited

U.S. PATENT DOCUMENTS

| 6,635,973 | B1 | 10/2003 | Kagoshima et al. |
| 6,745,117 | B1 * | 6/2004 | Thacher et al. .................. 701/50 |
| 2005/0001567 | A1 | 1/2005 | Yoshimatsu |
| 2011/0313608 | A1 | 12/2011 | Izumi et al. |

FOREIGN PATENT DOCUMENTS

| JP | 2000-295717 A | 10/2000 |
| JP | 2002-242234 A | 8/2002 |

(Continued)

OTHER PUBLICATIONS

International Search Report dated Jan. 15, 2013 with English translation (three (3) pages).

*Primary Examiner* — Jerrah Edwards
(74) *Attorney, Agent, or Firm* — Crowell & Moring LLP

(57) ABSTRACT

Provided is a hybrid construction machine together with a method for controlling that construction machine in a manner ensuring the operability of its combined operations regardless of fluctuations in the load on its work machine.

The hybrid construction machine has: a swing structure; a work machine attached to the swing structure; an engine mounted on the swing structure; a first electric motor driven by the engine, the motor being capable of generating power; a hydraulic pump driven by the engine and the first electric motor; a second electric motor for driving the swing structure; and a plurality of electric storage devices, wherein the hybrid construction machine further includes a first control unit which, in a combined operation involving the work machine and the swing structure, drives and controls the second electric motor by use of the electric power supplied from at least one electric storage device selected from the storage devices and from another electric storage device offering a higher output level and a lower stored energy level per unit weight than the selected at least one electric storage device, and drives and controls the hydraulic pump by use of the engine.

6 Claims, 8 Drawing Sheets

(51) Int. Cl.
*E02F 9/20* (2006.01)
*B60K 6/46* (2007.10)
*B60K 6/485* (2007.10)
*B66C 23/84* (2006.01)

(52) U.S. Cl.
CPC . *E02F 9/123* (2013.01); *E02F 9/20* (2013.01); *E02F 9/2075* (2013.01); *E02F 9/2091* (2013.01); *E02F 9/2095* (2013.01); *Y02T 10/6217* (2013.01); *Y02T 10/6226* (2013.01)

(56) References Cited

FOREIGN PATENT DOCUMENTS

| JP | 2003-155760 A | 5/2003 |
| JP | 2011-38298 A | 2/2011 |
| WO | WO 2010/114036 A1 | 10/2010 |

\* cited by examiner

FIG. 8
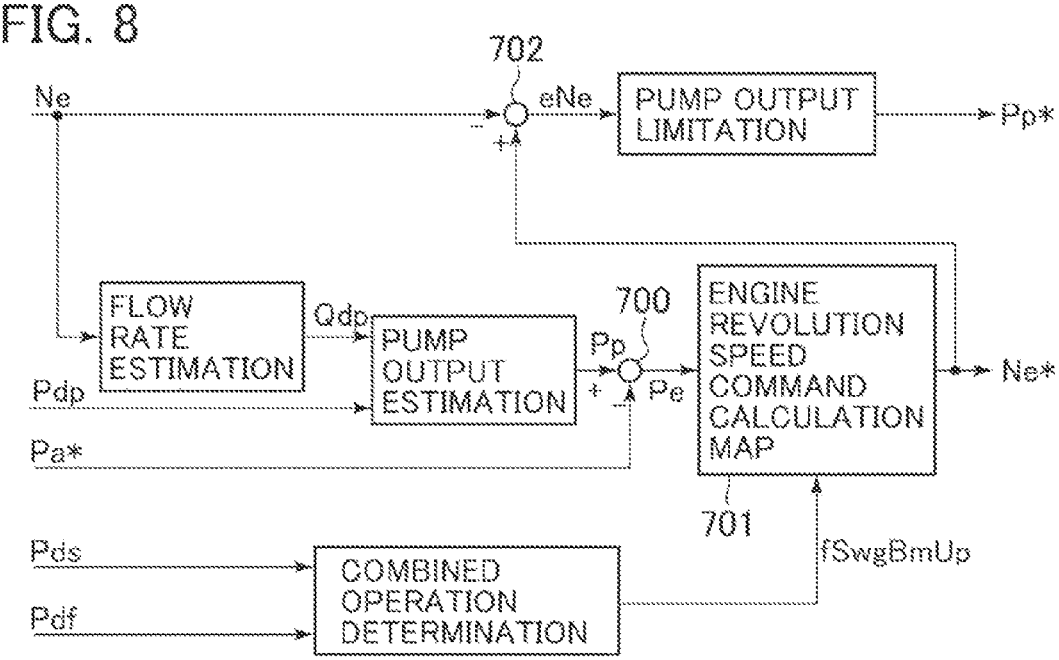
FIG. 9
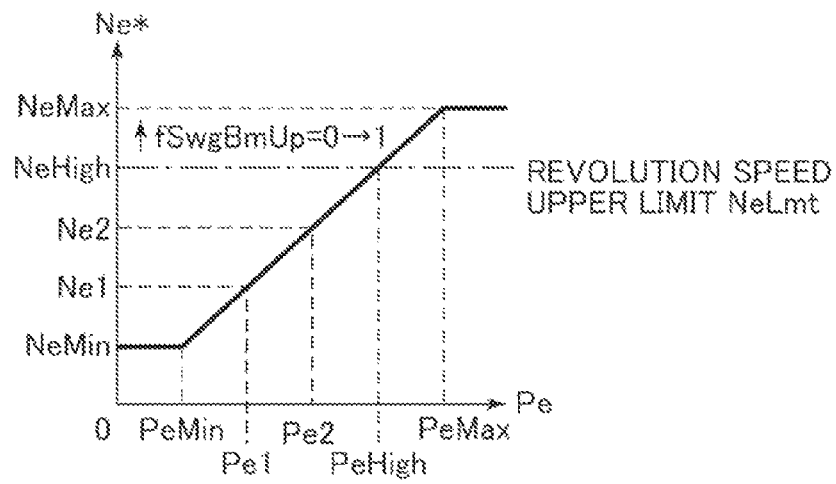
FIG. 10
|  | BATTERY STATE OF CHARGE: HIGH | BATTERY STATE OF CHARGE: LOW |
|---|---|---|
| fSwgBmUp=1 (IN COMBINED OPERATION) | NeLmt=NeHigh | NeLmt=NeMax |
| fSwgBmUp=0 (OTHERWISE) | NeLmt=NeHigh | NeLmt=NeHigh |

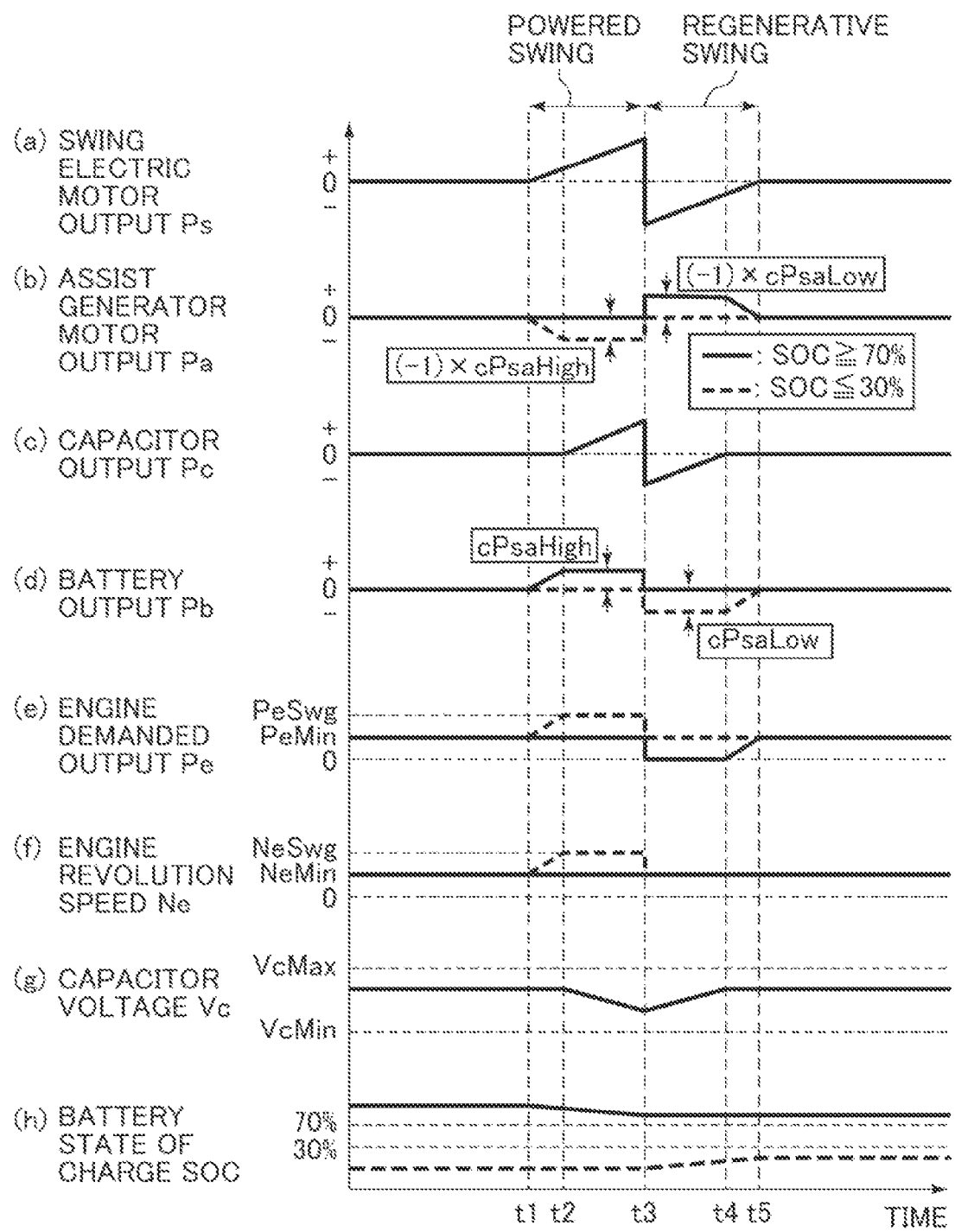

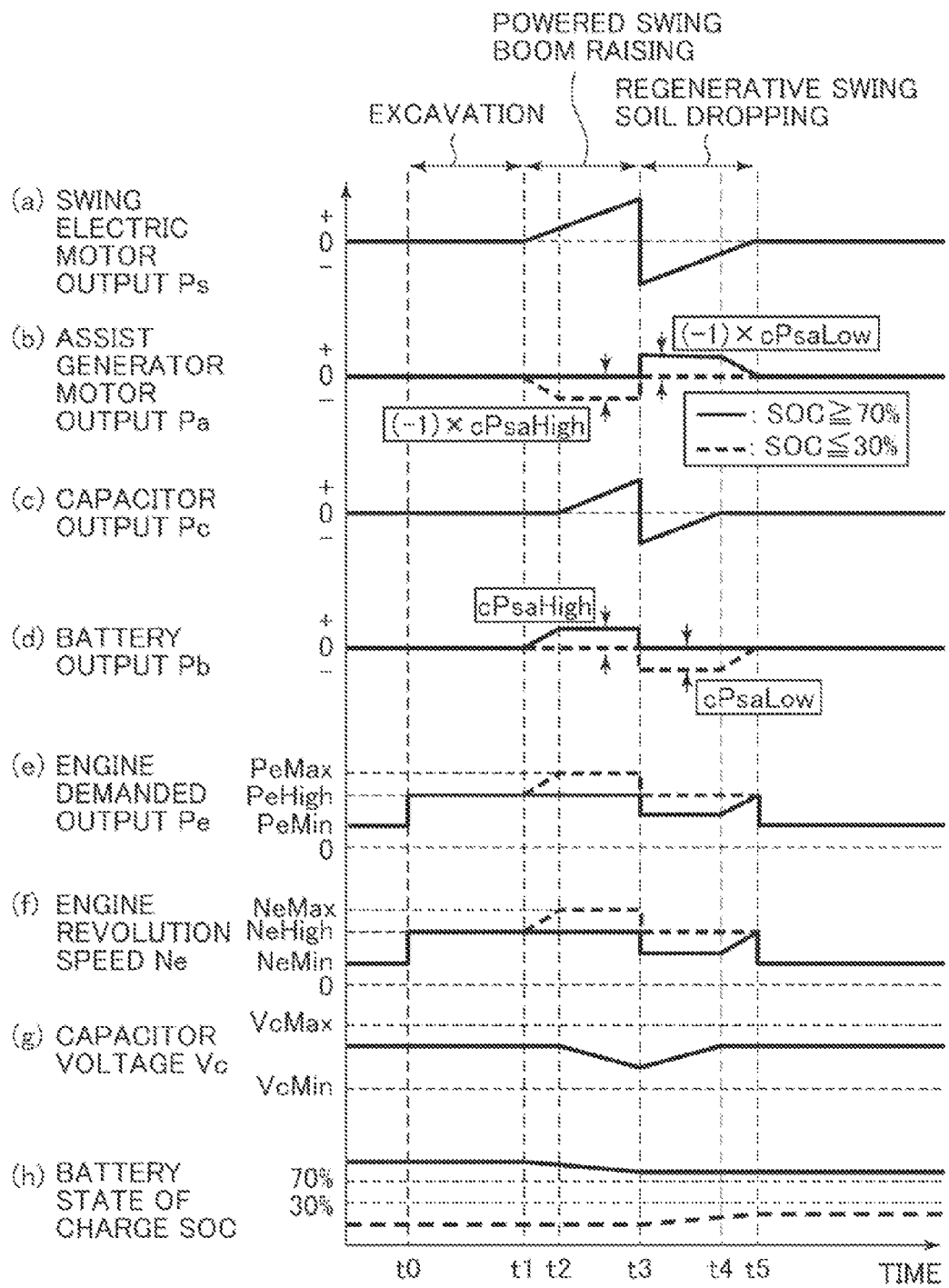

HYBRID CONSTRUCTION MACHINE AND METHOD FOR CONTROLLING THE SAME

TECHNICAL FIELD

The present invention relates to a hybrid construction machine and a method for controlling that machine. More particularly, the invention relates to a hybrid construction machine equipped with a generator motor driven by an engine to assist a hydraulic pump, an electric motor for driving a swing structure, an electric storage device, and a method for controlling that construction machine.

BACKGROUND ART

Most construction machines conventionally have had the engine driving a hydraulic pump that delivers pressure to rotate a hydraulic motor thereby to drive a swing structure serving as an inertial body. In recent years, there have been proposed hybrid construction machines having an engine-driven generator motor capable of generating electric power, an electric storage device such as a capacitor and battery, and an electric motor for driving a swing structure when supplied with electric energy from the electric storage device, whereby fuel economy is improved, noise level is lowered, and the amount of exhaust fumes is reduced (e.g., refer to Patent Literature 1).

Patent Literature 1 discloses a construction machine furnished with control means configured to connect a capacitor and a battery in parallel with the feeders of a swing structure drive electric motor and a generator motor in such a manner that the feeders are supplied with electricity first from the capacitor and then from the generator motor. The construction machine described in this literature allows its capacitor quickly to collect power regenerated from swing braking, thus aiming to improve energy efficiency and reduce the engine size.

The construction machines having the swing structure such as a hydraulic excavator frequently perform combined operations such as a swing boom raising operation in which the boom is raised while the swing structure is being swung. The shift in weight of the bucket as the load on the boom during the combined swing boom raising operation changes the balance between the swing speed of the swing structure and the boom raising speed changes, which can lower the operability for the operator. To reduce such variations in the balance between the swing speed of the swing structure and the boom raising speed, there has been proposed a hydraulic control system for construction machines, the system controlling the capacity of the swing electric motor in such a manner as to distribute engine power appropriately between the swing structure and the boom (e.g., refer to Patent Literature 2).

PRIOR ART LITERATURE

Patent Literature

Patent Literature 1
  JP-2002-242234-A
Patent Literature 2
  JP-2011-038298-A

SUMMARY OF THE INVENTION

Problem to be Solved by the Invention

The hybrid construction machine operates on a system in which the engine as one power source and the generator motor as another power source are both used to drive the hydraulic pump, the system being called a parallel drive system. In this parallel system, the engine drives the machine and the generator motor at the same time. The electric power generated through the generator motor in a generator action is charged into the electric storage device. Meanwhile, when it is necessary to assist the power of the engine, the generator motor is supplied with electric power from the electric storage device. Thus with the parallel system, maximum power of the entire system (maximum system power) is determined by the sum of the power of the engine and that of the electric storage device (electric power).

To perform such combined operations as the swing boom raising operation without losing operability on that hybrid construction machine, it is necessary to distribute power appropriately. Specifically, the power of the engine and that of the electric storage device need to be suitably distributed in supplying power to the hydraulic pump for controlling the boom raising speed and to the swing electric motor for controlling the swing speed of the swing structure.

The hybrid construction machine described in Patent Literature 1 sets a power supply sequence in which the feeders are supplied with power in the order of the capacitor, the generator motor, and the battery. The power from the generator motor is thus necessary if the power supplied from the capacitor to the swing structure drive electric motor is not sufficient. As a result, there is a fear of a worsened fuel economy for the engine loaded with driving both the generator motor and the hydraulic pump. Also, there is a possibility that the power necessary for driving the hydraulic pump may not be provided. In this case, it is difficult to maintain a good balance between the swing speed of the swing structure high enough to ensure operability on the one hand, and the boom raising speed on the other hand.

The present invention has been made in view of the above circumstances, and one object of the invention is to provide a hybrid construction machine having a swing structure drive electric motor and a method for controlling such a hybrid construction machine, the construction machine and the method being designed to ensure the operability of combined operations involving a swing structure and a work machine attached to the swing structure regardless of variation in load on a work machine.

Means for Solving the Problems

To achieve the above object, a hybrid construction machine according to a first aspect of the present invention has: a swing structure; a work machine attached to the swing structure; an engine mounted on the swing structure; a first electric motor driven by the engine, the motor being capable of generating power; a hydraulic pump driven by the engine and the first electric motor; a hydraulic actuator which drives and operates the work machine by use of power generated through the hydraulic pump; a second electric motor for driving the swing structure; and a plurality of electric storage devices for supplying electric power to drive the first electric motor and the second electric motor and for being charged with electric power generated through the first electric motor and the second electric motor, wherein the hybrid construction machine further includes: a first control unit which, in a combined operation involving the work machine and the swing structure, drives and controls the second electric motor by use of the electric power supplied from at least one electric storage device selected from the storage devices and from another electric storage device offering a higher output level and a lower stored energy level per unit weight than the selected at least one electric storage device, and drives and controls the hydraulic pump by use of the engine.

The hybrid construction machine according to a second aspect of the present invention in the first aspect further has: a second control unit which drives and controls the second electric motor by use of the electric power generated through the first electric motor driven by the engine for power generation and the electric power coming from the electric storage device offering the higher output level and the lower stored energy level per unit weight than the selected at least one electric storage device, and a control switching unit which switches between the first control unit and the second control unit in accordance with state of charge of the electric storage device selected at the first control unit.

The hybrid construction machine according to a third aspect of the present invention in the second aspect, further includes: an engine revolution speed control unit which controls the engine revolution speed of the engine at a first revolution speed when the first control unit is selected, and at a second revolution speed higher than the first revolution speed when the second control unit is selected.

A method for controlling a hybrid construction machine according to a fourth aspect of the present invention includes: a swing structure; a work machine attached to the swing structure; an operating device for operating the swing structure and the work machine; an engine mounted on the swing structure; a first electric motor driven by the engine, the motor being capable of generating power; a hydraulic pump driven by the engine and by the first electric motor; a hydraulic actuator which drives and operates the work machine by use of power generated through the hydraulic pump; a second electric motor for driving the swing structure; and a plurality of electric storage devices for supplying electric power to drive the first electric motor and the second electric motor and for being charged with electric power generated through the first electric motor and the second electric motor, the method including a first control mode for executing: a first step of determining whether a combined operation involving the work machine and the swing structure in accordance with operating status of the operating device is present or absent; a second step which, if the first step determines that the combined operation involving the work machine and the swing structure is present, drives the second electric motor by use of the electric power supplied from at least one electric storage device selected from the plurality of storage devices and from another electric storage device offering a higher output level and a lower stored energy level per unit weight than the selected at least one electric storage device, and a third step of driving and controlling the hydraulic pump by use of the engine.

The method for controlling the hybrid construction machine according to a fifth aspect of the present invention in the fourth aspect, further includes: a second control mode in which the second electric motor is driven and controlled with the electric power generated through the first electric motor driven by the engine for power generation and supplied from the electric storage device offering the higher output level and the lower stored energy level per unit weight than that at least one electric storage device selected in the first control mode, wherein the first and the second control modes are switched back and forth in accordance with state of charge of the electric storage device selected in the first control mode.

The method for controlling the hybrid construction machine according to a sixth aspect of the present invention in the fifth aspect, wherein the engine revolution speed is controlled at a first revolution speed when the first control mode is selected, and at a second revolution speed higher than the first revolution speed when the second control mode is selected.

Effect of the Invention

According to the present invention, when the swing structure and the work machine attached thereto operate in a combined operation, the swing structure drive electric motor is supplied with electric power from the battery (an electric storage device having a low output level and a high stored energy level per unit weight) and from the capacitor (an electric storage device having a high output level and a low stored energy level per unit weight), and the output of the hydraulic pump is controlled in keeping with engine power. This makes it possible suitably to provide the electric power for driving the swing structure and the power for driving the hydraulic pump. As a result, in a swing boom raising operation as a combined operation involving the swing structure and the work machine attached thereto, a good balance is maintained between the swing speed of the swing structure and the boom raising speed. This ensures the operability of combined operations performed by the hybrid construction machine.

BRIEF DESCRIPTION OF THE DRAWINGS

FIG. 8 is a control block diagram showing details of processing performed by an engine revolution speed control unit constituting a part of the integrated controller in FIG. 3.

FIG. 9 is a characteristic diagram showing details of processing performed by an engine revolution speed command calculation map constituting a part of the engine revolution speed control unit in FIG. 8.

FIG. 10 is a tabular view showing a method for setting the upper limits on the engine revolution speed using the engine revolution speed command calculation map constituting a part of the engine revolution speed control unit.

FIG. 11 is a timing chart showing a method for controlling a swing operation with one embodiment of the present invention in the form of a hybrid construction machine and a method for controlling that machine.

FIG. 12 is a timing chart showing a method for controlling an excavating operation with one embodiment of the present invention in the form of a hybrid construction machine and a method for controlling that machine.

MODE FOR CARRYING OUT THE INVENTION

Figure 1:
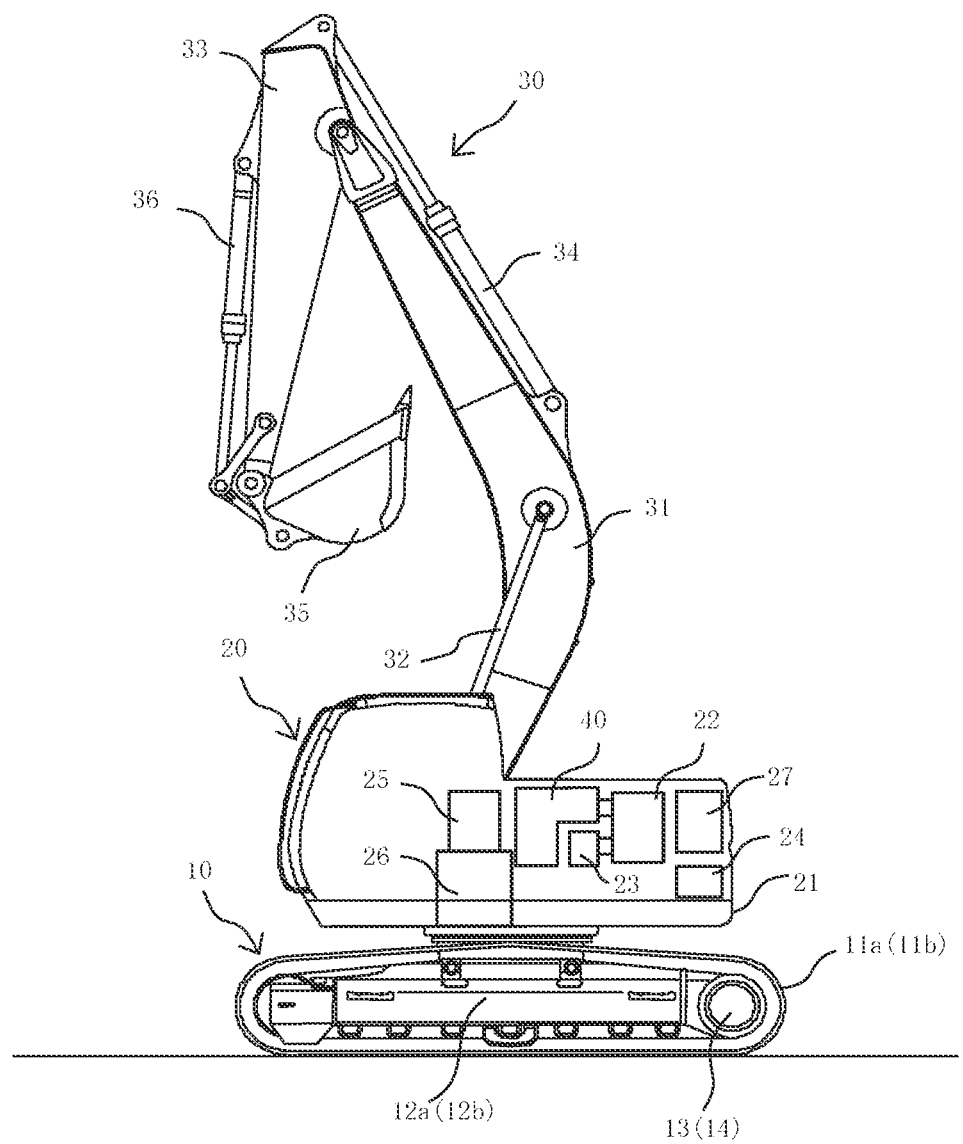
FIG. 1 is a side view of a hydraulic excavator to which one embodiment of the present invention is applied in the form of a hybrid construction machine and a method for controlling that machine.
Figure 2:
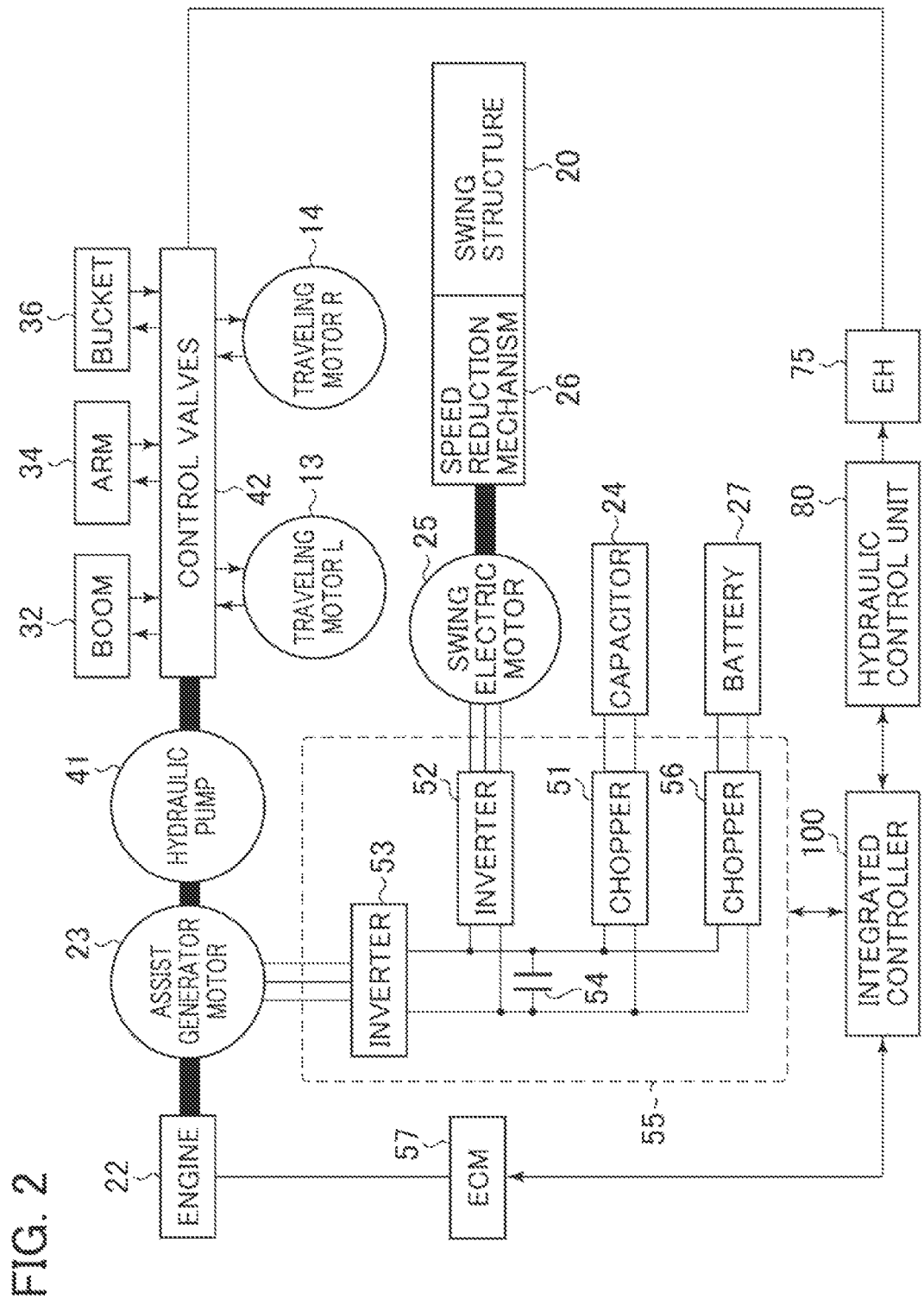
FIG. 2 is a system configuration diagram of electric-hydraulic equipment constituting one embodiment of the present invention in the form of a hydraulic construction machine and a method for controlling that machine.
Figure 3:
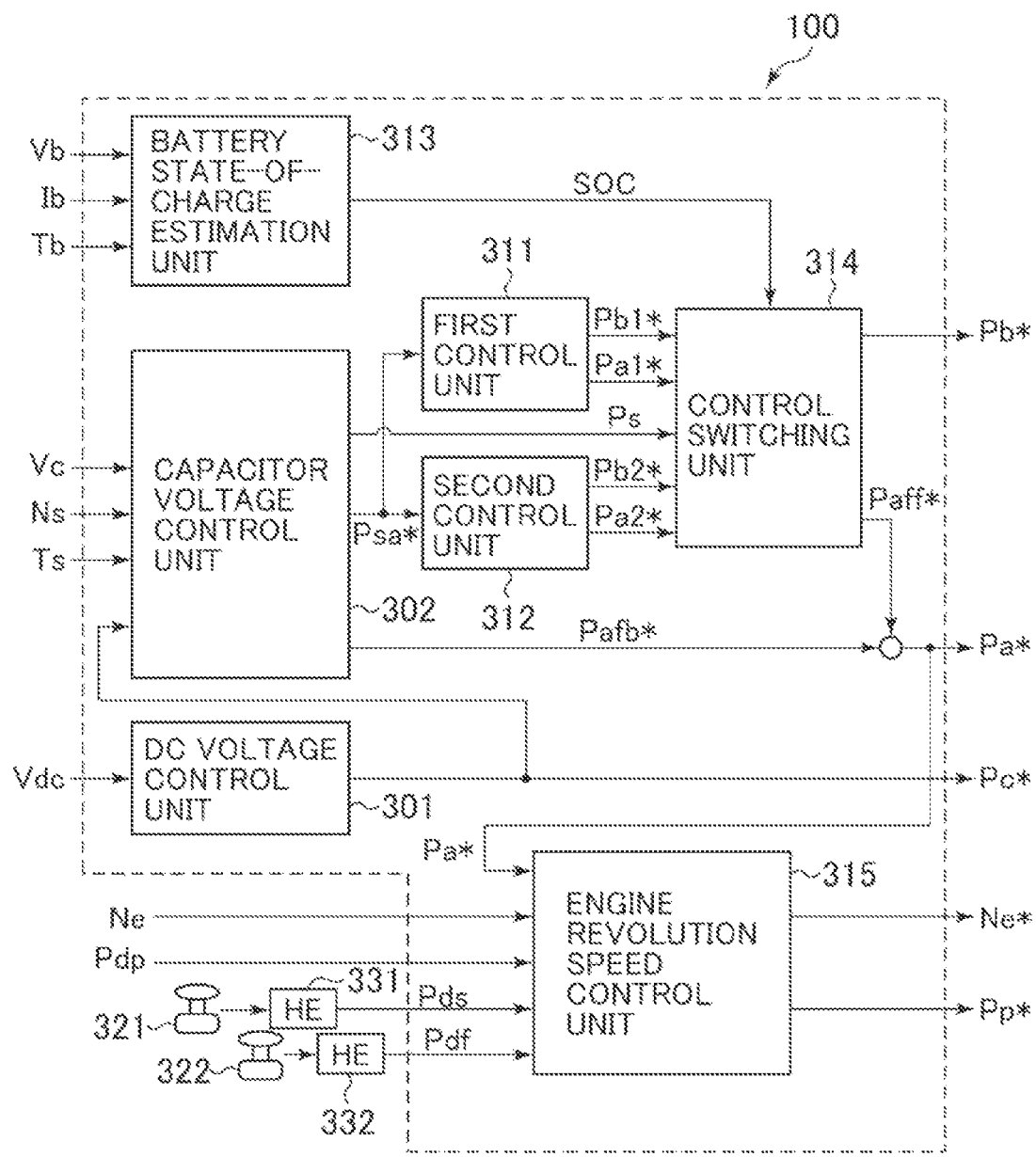
FIG. 3 is a functional block diagram showing details of processing performed by an integrated controller constituting a part of one embodiment of the present invention in the form of a hybrid construction machine and a method for controlling that machine.

An embodiment of the present invention is explained below with the use of a hydraulic excavator constituting a hybrid construction machine as an example. Since this invention can be applied to all construction machines equipped with a swing structure (including work machines), the application of the invention should not be limited to hydraulic excavators. For example, the present invention can be applied to other construction machines including truck cranes furnished with the swing structure. FIG. 1 is a side view of a hydraulic excavator to which one embodiment of the present invention is applied in the form of a hybrid construction machine and a method for controlling that machine; FIG. 2 is a system configuration diagram of electric-hydraulic equipment constituting one embodiment of the present invention in the form of a hydraulic construction machine and a method for controlling that machine; and FIG. 3 is a functional block diagram showing details of processing performed by an integrated controller constituting a part of one embodiment of the present invention in the form of a hybrid construction machine and a method for controlling that machine.

In FIG. 1, the hydraulic excavator is equipped with a track structure 10, a swing structure 20 mounted swingably on the track structure 10, and an articulated work machine 30 attached to the swing structure 20.

The track structure 10 is made up of a pair of crawlers 11a and 11b, a pair of crawler frames 12a and 12b (only one side shown in FIG. 1), a pair of traveling hydraulic motors 13 and 14 for driving and controlling the crawlers 11a and 11b independently, and speed reduction mechanisms for use with the components.

The swing structure 20 is made up of a swing frame 21, an engine 22 mounted on the swing frame 21 as a prime mover, a first electric motor 23 driven by the engine 22 to generate electric power (called the assist generator motor 23 hereunder), a second electric motor 25 (called the swing electric motor hereunder), an electric double layer capacitor 23 connected electrically to the assist generator motor 23 and swing electric motor 25, a lithium ion battery 27, and a speed reduction mechanism 26 for reducing the revolutions of the swing electric motor 25. The dive power of the swing electric motor 25 is transmitted via the speed reduction mechanism 26 thereby to drive the swing structure 20 (swing frame 21) swingably relative to the track structure 10.

The work machine 30 is mounted on the swing structure 20. The work machine 30 is composed of a boom 31 mounted elevatably on the swing frame 21 of the swing structure 20, a boom cylinder 32 for driving the boom 31, an arm 33 pivoted near the tip of the boom 31, an arm cylinder 34 for driving the arm 33, a bucket 35 pivoted at the tip of the arm 33, and a bucket cylinder 36 for driving the bucket 35.

Further mounted on the swing frame 21 of the swing structure 20 is a hydraulic system 40 for driving hydraulic actuators such as the traveling hydraulic motors 13 and 14, boom cylinder 32, arm cylinder 34, and bucket cylinder 36 mentioned above. The hydraulic system 40 includes a hydraulic pump 41 as a hydraulic source for generating hydraulic pressure and control valve 42 (FIG. 2) for driving and controlling the actuators. The hydraulic pump 41 is driven by both the engine 22 and the assist generator motor 23.

Explained next with the use of FIG. 2 is a system configuration of the electric-hydraulic equipment constituting the hydraulic excavator.

The power of the engine 22 is transmitted to the hydraulic pump 41 via the assist generator motor 23. In response to commands from control levers to be discussed later, the control valve 42 control the delivery amounts and delivery directions of hydraulic operating fluid to the boom cylinder 32, arm cylinder 34, bucket cylinder 36, and traveling hydraulic motors 13 and 14.

A chopper 51 raises DC power from the capacitor 24 to a predetermined DC voltage before being input to an inverter 52 for driving the swing electric motor 25 and to an inverter 53 for driving the assist generator motor 23. A chopper 56 also raises DC power from the battery 27 to a predetermined DC voltage before being input to the inverter 52 for driving the swing electric motor 25 and to the inverter 53 for driving the assist generator motor 23. A smoothing capacitor 54 is provided to stabilize the DC voltages. The swing electric motor 25 drives the swing structure 20 via the speed reduction mechanism 26. The capacitor 24 and battery 27 are charged or discharged depending on drive status of the assist generator motor 23 and swing electric motor 25 (i.e., powering or regenerating).

An integrated controller 100 outputs command signals to an engine control unit 57 (called the ECM hereunder), to a power control unit 55 (called the PCU hereunder), and to a hydraulic control unit 80 (called the MCU hereunder) with the use of control lever signals, pressure signals, revolution speed signals, etc. (not shown) to provide controls such as switchover between various control modes, swing control, engine control, energy management, and monitoring of an electric system for abnormality. A solenoid proportional valve 75 is provided as a device that transforms the electrical signal coming from the MCU 80 into a hydraulic signal. The hydraulic signal drives the control valve 42 to control the flow rate and direction of hydraulic fluid to each of the actuators. Also, the hydraulic signal drives a tilt angle drive unit (not shown) for the swash plate of the hydraulic pump 41, thereby controlling a delivery flow rate of the hydraulic pump 41.

Details of processing performed by the above-described integrated controller 100 are explained next with the use of FIG. 3.

The details of the processing to be described below are programmed in the integrated controller 100 and carried out repeatedly at predetermined intervals. In the ensuing description, the output of the electric motors 23 and 25 will be defined to be negative values on the powering side and positive values on the regenerative side (power generating side); and the output of the capacitor 24 and battery 27 will be defined to be positive values on the discharging side and negative values on the charging side.

In FIG. 3, a DC voltage control unit 301 calculates a capacitor output command Pc* in accordance with the value of a DC voltage Vdc (voltage between both ends of the smoothing capacitor 54) detected at the PCU 55 shown in FIG. 2. The integrated controller 100 outputs the capacitor output command Pc* thus calculated to the PCU 55. The PCU 55 controls the DC power of the chopper 51 in keeping with the value output from the integrated controller 100, thereby stabilizing the DC voltage Vdc within a predetermined range. Details of the processing performed by the DC voltage control unit 301 will be discussed later.

A capacitor voltage control unit 302 calculates a swing assist output Psa* and an assist F/B output command Pafb* in accordance with the voltage Vc of the capacitor 24 detected at the PCU 55, a revolution speed Ns and torque Ts of the swing electric motor 25, and the capacitor output command Pc* calculated by the DC voltage control unit 301. Here, the swing assist output Psa* is a parameter for calculating output command values for the battery 27 and assist generator motor 23 when the electric power for the swing electric motor 25 is to be shared by the capacitor 24, battery 27, and assist generator motor 23. The assist F/B output command Pafb* is a parameter for correcting the output command value for the assist generator motor 23 so as to let the voltage Vc of the capacitor 24 settle within a predetermined range. Details of the processing performed by the capacitor voltage control unit 302 will be discussed later.

A first control unit 311 calculates a first battery output command Pb1* and a first assist output command Pa1* in response to the swing assist output Psa* calculated by the capacitor voltage control unit 302. Likewise, a second control unit 312 calculates a second battery output command Pb2* and a second assist output command Pa2* in response to the swing assist output Psa* calculated by the capacitor voltage control unit 302. Details of the processing performed by the first control unit 311 and second control unit 312 will be discussed later.

A battery state-of-charge estimation unit 313 calculates a battery state of charge SOC in accordance with the voltage Vb, current Ib, and temperature Tb of the battery 27 detected at the PCU 55. Details of the processing performed by the battery state-of-charge estimation unit 313 will be discussed later.

A control switching unit 314 calculates a battery output command Pb* and an assist F/F output command Paff* in accordance with the first battery output command Pb1* and the first assist output command Pa1* calculated at the first control unit 311, the second battery output command Pb2* and the second assist output command Pa2* calculated by the second control unit 312, and the battery state of charge SOC calculated at the battery state-of-charge estimation unit 313. The integrated controller 100 outputs the battery output command Pb* to the PCU 55. In response to the value output from the integrated controller 100, the PCU 55 controls the DC power of a chopper 56 to regulate charging and discharging current of the battery 27. Details of the processing performed by the control switching unit 314 will be discussed later.

The integrated controller 100 calculates an assist output command Pa* through adding the assist F/B output command Pafb* calculated at the capacitor voltage control unit 302 to the assist F/F output command Paff* calculated at the control switching unit 314. The integrated controller 100 outputs the assist output command Pa* to the PCU 55. In keeping with the value output from the integrated controller 100, the PCU 55 controls the DC power of the inverter 53 to regulate the powering/generated power of the assist generator motor 23.

Also in FIG. 3, a hydraulic pilot signal generated through an input from a swing control lever 321 is converted to a swing pilot pressure Pds by a hydraulic-to-electric signal conversion device 331 such as a pressure sensor before being input to the integrated controller 100. Likewise, a hydraulic pilot signal generated through an input from a control lever 322 of the work machine 30 (boom 31, arm 33, bucket 35, etc.) is converted to a front pilot pressure Pdf by a hydraulic-to-electric signal conversion device 332 before being input to the integrated controller 100.

An engine revolution speed control unit 315 calculates an engine revolution speed command Ne* and a hydraulic pump output command Pp* in accordance with input signals such as the assist output command Pa*, the engine revolution speed Ne detected by the ECM 57, a delivery pressure Pdp of the hydraulic pump 41 detected by the MCU 80, the swing pilot pressure Pds, and the front pilot pressure Pdf. The calculation is carried out in such a manner that, with the load on the hydraulic pump 41 taken into consideration, a maximum fuel economy will be attained and machine operation will proceed with high exhaust performance. The integrated controller 100 outputs the engine revolution speed command Ne* to the ECM 57. In response to the value output from the integrated controller 100, the ECM 57 controls the torque of the engine 22 to regulate the revolution speed of the engine 22.

The integrated controller 100 outputs the pump output command Pp* to the MCU 80. In keeping with the value output from the integrated controller 100, the MCU 80 controls the control valve 42 via the solenoid proportional valve 75 while also driving the tilt angle drive unit (not shown) for the swash plate of the hydraulic pump 41, thereby controlling the delivery flow rate of the hydraulic pump 41 to adjust its load. Details of the processing performed by the engine revolution speed control unit 315 will be discussed later.

Figure 4:
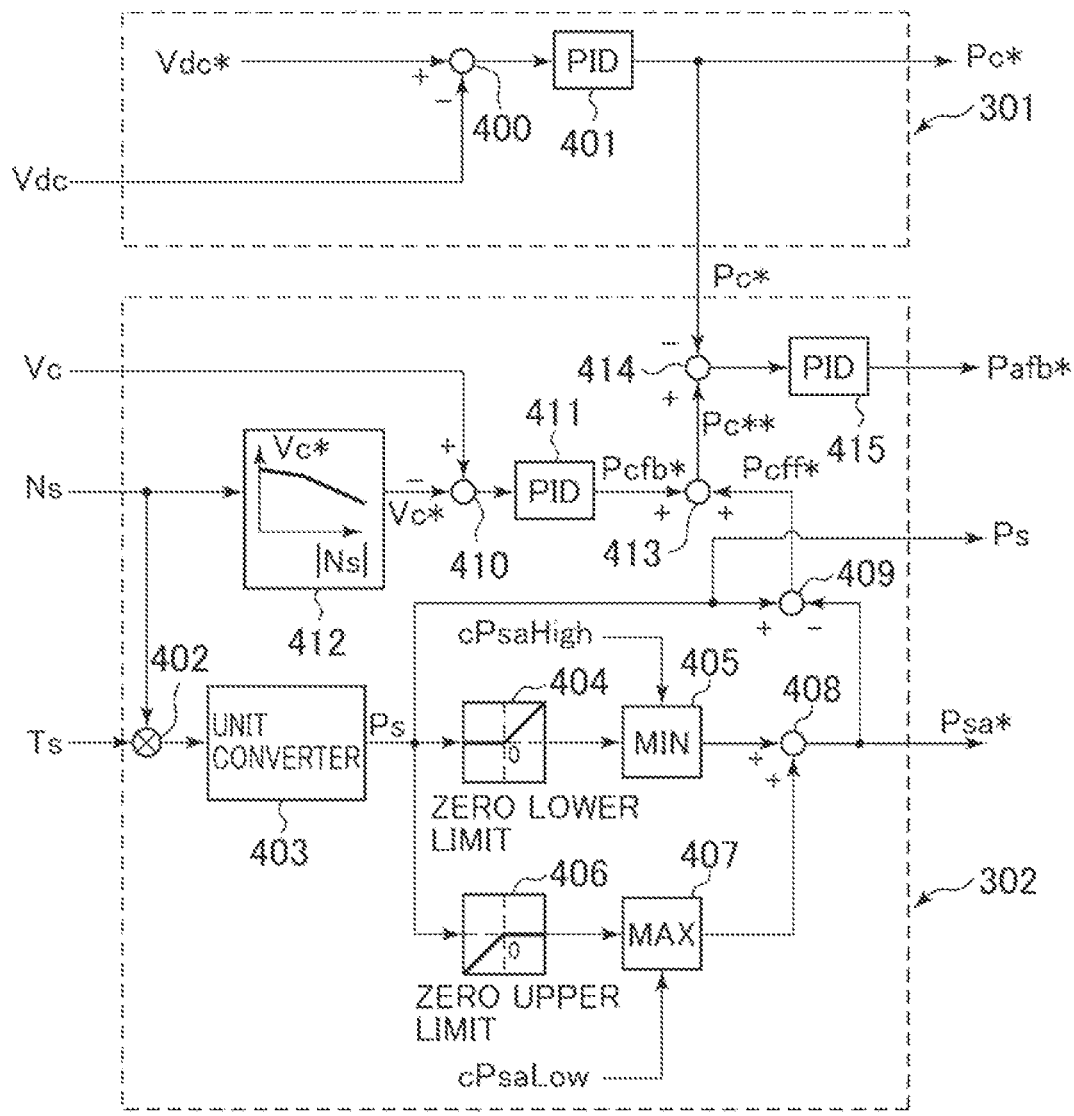
FIG. 4 is a control block diagram showing details of processing performed by a DC voltage control unit and a capacitor voltage control unit constituting a part of the integrated controller in FIG. 3.

Details of the processing performed by the various control units making up the integrated controller 100 are explained below with the use of the accompanying drawings. FIG. 4 is a control block diagram showing details of the processing performed by the DC voltage control unit and capacitor voltage control unit constituting a part of the integrated controller in FIG. 3. The reference characters in FIG. 4 that are the same as those in FIGS. 1 through 3 have same components which will not be discussed further in detail.

The DC voltage control unit 301 uses a subtractor 400 to obtain a deviation between the DC voltage Vdc and a DC voltage command Vdc* determined beforehand on the basis of the equipment specifications of inverters/choppers. In response to the deviation coming from the subtractor 400, the DC voltage control unit 301 calculates the capacitor output command Pc* by means of feedback control such as PID control of a PID controller 401.

The capacitor voltage control unit 302 uses a multiplier 402 to multiply the revolution speed Ns of the swing electric motor 25 by the torque Ts of the swing electric motor 25, converts the product from the multiplier 402 into predetermined units with the use of a unit converter 403, and thereby calculates a swing electric motor output Ps.

Next, the swing electric motor output Ps whose lower limit is limited to zero by a limiter 404 and the low value of a swing assist output upper limit cPsaHigh determined on the basis of a predetermined swing pattern are selected by a low-value selector 405 to calculate the swing assist output Psa* at the time of a powered swing operation (Ps≥0). Likewise, the swing electric motor output Ps whose upper limit is limited to zero by a limiter 406 and the high value of a swing assist output lower limit cPsaLow determined on the basis of a predetermined swing pattern are selected with a high-value selector 407 to calculate the swing assist output Psa* at the time of a regenerative swing operation (Ps≤0).

The value from the low-value selector 405 and that from the high-value selector 407 are added up with an adder 408 to calculate the swing assist output Psa*. The swing assist output Psa* is subtracted from the swing electric motor output Ps with a subtractor 409 to calculate a capacitor F/F output command Pcff*.

The capacitor voltage control unit 302 uses a subtractor 410 to obtain a deviation between the capacitor voltage Vc and a capacitor voltage command Vc* in such a manner that the capacitor voltage Vc will converge on the capacitor voltage command Vc*. In response to the deviation coming from the subtractor 410, the capacitor voltage control unit 302 calculates a capacitor F/B output command Pcfb* by means of feedback control such as PID control of a PID controller 411.

The capacitor voltage Vc needs to be raised in preparation to supplying electric power to the swing electric motor 25 for a powering operation if the speed of the swing structure 20 is low; if the speed of the swing structure 20 is high, then the capacitor voltage Vc needs to be lowered in preparation to being supplied with regenerated power from the swing electric motor 25. For this reasons, the capacitor voltage command Vc* should preferably be set in accordance with an absolute value |Ns| of the swing electric motor revolution speed Ns. Thus the capacitor voltage command Vc* is set by a function generator 412 whose input is the swing electric motor revolution speed Ns and output is configured to have the above-described characteristics.

Furthermore, the capacitor voltage control unit 302 calculates a capacitor output demand Pc with the use of an adder 413** to add up the capacitor F/F output command Pcff* and capacitor F/B output command Pcfb* to calculate a deviation between the capacitor output demand Pc** and the capacitor output command Pc* with the use of a subtractor 414. In response to the deviation coming from the subtractor 414, the capacitor voltage control unit 302 calculates the assist F/B output command Pafb* by means of feedback control such PID control of a PID controller 415.

As explained above, the PCU 55 controls the DC power of the chopper 51 to regulate the charging and discharging current of the capacitor 24 on the basis of the result of the calculation by the DC voltage control unit 301, whereby the DC voltage Vdc can be stabilized.

The capacitor voltage control unit 302 also may calculate an output correction value (i.e., assist F/B output command Pafb*) for the assist generator motor 23 in such a manner that the capacitor voltage Vc will converge on the capacitor voltage command value Vc* with the power for the swing electric motor 25 shared by the capacitor 24 and the other devices (battery 27 and assist generator motor 23). That is, the DC voltage control unit 301 and capacitor voltage control unit 302 combine to control stabilization of the DC voltage Vdc and manage charging and discharging of the capacitor 24 in a well-balanced manner.

Details of the processing performed by the first control unit 311 and second control unit 312 are explained next. As shown in FIG. 3, the first control unit 311 calculates the first battery output command Pb1* and the first assist output command Pa1* in response to the swing assist output Psa* calculated at the capacitor voltage control unit 302 and in accordance with a mathematical expression 1 below on the basis of a determinant.

$$\begin{bmatrix} Pb1^* \\ Pa1^* \end{bmatrix} = \begin{bmatrix} Psa^* \\ 0 \end{bmatrix} \qquad \text{[Math. 1]}$$

As can be understood from the mathematical expression 1 above, the first control unit 311 calculates the output command values for the battery 27 and assist generator motor 23 in such a manner that the electric power for the swing electric motor 25 will be shared by the capacitor 24 and battery 27. The discharge output and the charge output of the battery 27 in this case are defined to be a positive value and a negative value, respectively, so that the swing assist output Psa* is substituted unmodified into the first battery output command Pb1*.

The second control unit 312 calculates the second battery output command Pb2* and the second assist output command Pa2* in response to the swing assist output Psa* calculated at the capacitor voltage control unit 302 and in accordance with a mathematical expression 2 below on the basis of a determinant.

$$\begin{bmatrix} Pb2^* \\ Pa2^* \end{bmatrix} = \begin{bmatrix} 0 \\ -Psa^* \end{bmatrix} \qquad \text{[Math. 2]}$$

As can be understood from the mathematical expression 2 above, the second control unit 312 calculates the output command values for the battery 27 and assist generator motor 23 in such a manner that the electric power for the swing electric motor 25 will be shared by the capacitor 24 and assist generator motor 23. The powering output and the generated output of the assist generator motor 23 in this case are defined to be a positive value and a negative value, respectively, so that the swing assist output Psa* with its sign inverted is substituted into the second assist output command Pa2*.

As explained above, the first control unit 311 obtains the output command values for the battery 27 and assist generator motor 23 in such a manner as to have the electric power for the swing electric motor 25 shared by the capacitor 24 and battery 27. Likewise, the second control unit 312 acquires the output command values for the battery 27 and assist generator motor 23 in such a manner as to have the electric power for the swing electric motor 25 shared by the capacitor 24 and assist generator motor 23.

Figure 5:
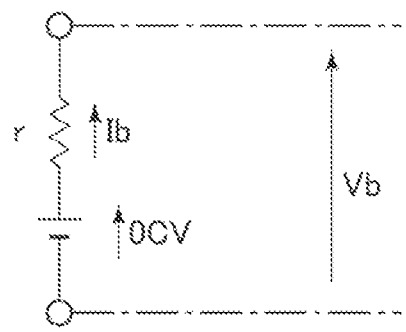
FIG. 5 is a schematic model diagram explaining the function of a battery constituting a part of one embodiment of the present invention in the form of a hybrid construction machine and a method for controlling that machine.
Figure 6:
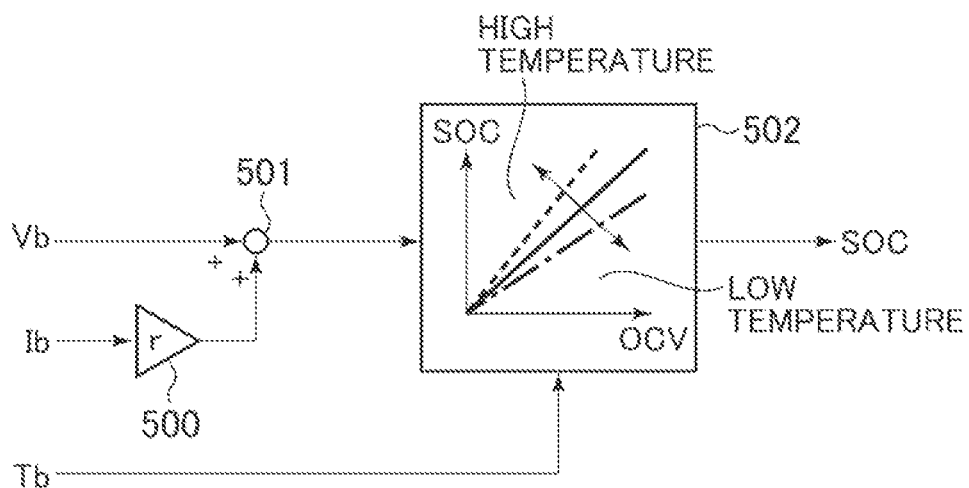
FIG. 6 is a control block diagram showing details of processing performed by a battery state-of-charge estimation unit constituting a part of the integrated controller in FIG. 3.

Details of the processing performed by the battery state-of-charge estimation unit 313 will now be explained with the use of FIGS. 5 and 6. FIG. 5 is a schematic model diagram explaining the function of the battery constituting a part of one embodiment of the present invention in the form of a hybrid construction machine and a method for controlling that machine. FIG. 6 is a control block diagram showing details of the processing performed by the battery state-of-charge estimation unit constituting a part of the integrated controller in FIG. 3. The reference characters in FIGS. 5 and 6 that are the same as those in FIGS. 1 through 4 refer to the same components, and these components will not be discussed further in detail.

The voltage Vb of the battery 27 detected at the PCU 55 contains a loss incurred by an internal resistance r of the battery 27, as shown in FIG. 5. Thus an open-circuit voltage OCV of the battery 27 that corresponds to the actual state of charge of the battery 27 is expressed by the following mathematical expression 3:

$$Vb = OCV - r \cdot Ib$$

$$\therefore OCV = Vb + r \cdot Ib \qquad \text{[Math. 3]}$$

In FIG. 6, the battery state-of-charge estimation unit 313 calculates the battery open-circuit voltage OCV with the use of an adder 501 to add up the battery voltage Vb detected at the PCU 55 and the value obtained by a multiplier 500 multiplying the current Ib of the battery 27 by its internal resistance r, in such a manner that the mathematical expression 3 will hold. The battery state of charge SOC is obtained with the use of a function generator 502 normalizing the value of the battery open-circuit voltage OCV to a predetermined value (e.g., 0 to 100%). The function generator 502, with the battery level lowered at low temperature and raised at high temperature, correctively calculates the value of the battery state of charge SOC in keeping with the temperature Tb of the battery 27 detected at the PCU 55 because the battery state of charge SOC is highly dependent on temperature.

The battery state-of-charge estimation unit 313 discussed above thus makes it possible to estimate the state of charge of the battery 27.

Figure 7:
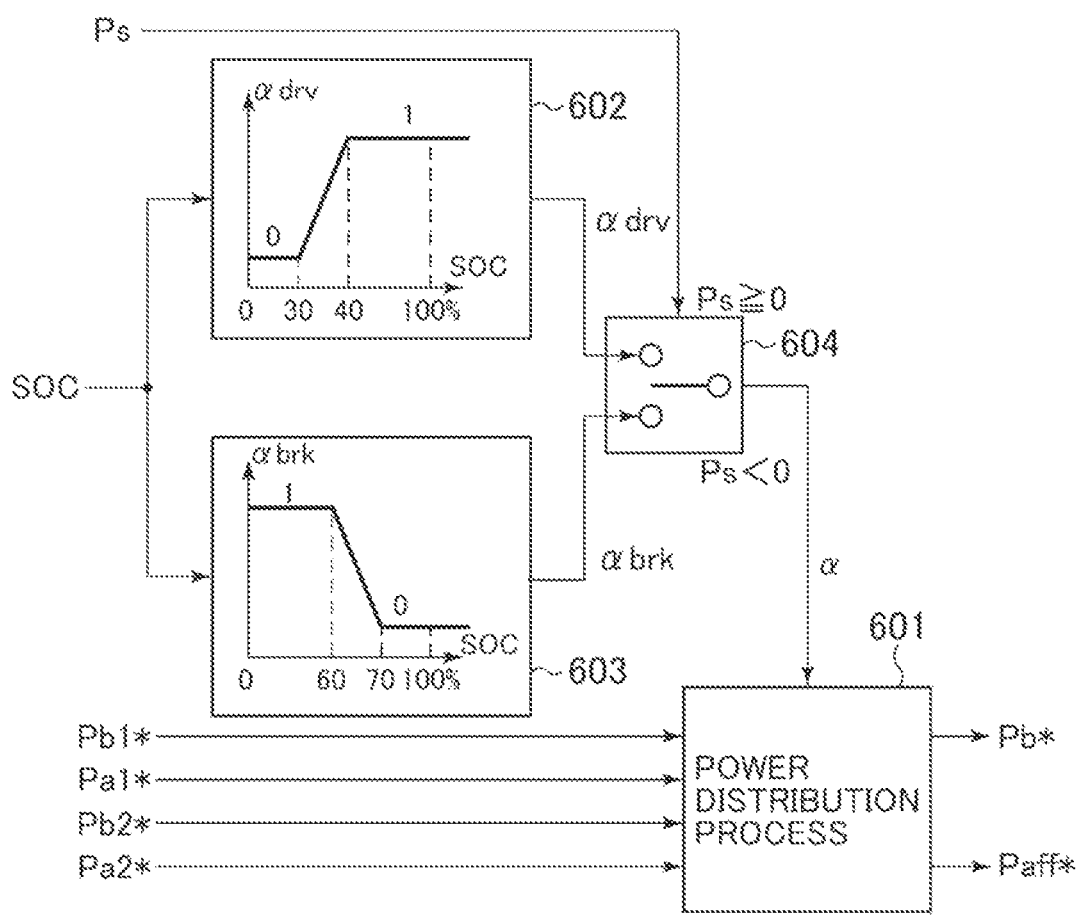
FIG. 7 is a control block diagram showing details of processing performed by a control switching unit constituting a part of the integrated controller in FIG. 3.

Details of the processing performed by the control switching unit 314 is explained next with the use of FIG. 7. FIG. 7 is a control block diagram showing details of the processing performed by the control switching unit constituting a part of the integrated controller in FIG. 3. The reference characters in FIG. 7 that are the same as those in FIGS. 1 through 6 refer to the same components, and these components will not be discussed further in detail.

The control switching unit 314 determines whether the swing electric motor 25 is in powering operation or in regenerative operation depending on the swing assist output Ps calculated at the capacitor voltage control unit 302. If the swing electric motor 25 is determined to be in powered swing operation, a distribution parameter αdrv is selected (α=αdrv); if the swing electric motor 25 is determined to be in regenerative swing operation, a distribution parameter αbrk is selected (α=αbrk). The power distribution parameter α is calculated in this manner.

The distribution parameter αdrv at the time of a powered swing operation is set by a function generator 602. This is a parameter for determining the electric power to be discharged from the battery 27 when the swing motor 25 is in powered swing operation. For example, when the battery state of charge SOC is between 40% and 100%, the parameter αdrv is configured to 1 (αdrv=1) to have the capacitor 24 and battery 27 supplying power while suppressing the power generation of the assist generator motor 23. When the battery state of charge SOC drops below 40%, the parameter αdrv is gradually lowered (αdrv=1→0) so that the electric power that was supplied by the battery 27 in keeping with the drop of the battery state of charge SOC will be compensated by the assist generator motor 23. Further, when the battery state of charge SOC drops below 30%, the parameter αdrv is configured to zero (αdrv=0) in such a manner that the electric power will be supplied by the capacitor 24 and assist generator motor 23 while the battery 27 is kept from discharging.

Likewise, the distribution parameter αbrk at the time of a regenerative swing operation is configured at a function generator 603 as the parameter for determining the electric power to be charged into the battery 27 when the swing electric motor 25 is in regenerative swing operation. For example, when the battery state of charge SOC is between 0 to 60%, the parameter αbrk is configured to 1 (αbrk=1) to let the capacitor 24 and battery 27 collect electric power while the assist generator motor 23 is kept from performing powering operation. When the battery state of charge SOC rises above 60%, the parameter αbrk is gradually lowered (αbrk=1→0) so that the electric power the battery 27 collected in keeping with the rise in battery state of charge SOC will be compensated by the assist generator motor 23. Further, when the battery state of charge SOC rises above 70%, the parameter αbrk is configured to zero (αbrk=0) so as to let the capacitor 24 and assist generator motor 23 collect electric power while the battery 27 is kept from being charged.

The control switching unit 314 subsequently uses an analog switch 604 to determine whether the swing motor is in powering operation or in regenerative operation depending on the swing motor output Ps calculated at the capacitor voltage control unit 302. The analog switch 604 selects the distribution parameter αdrv (α=αdrv) or the distribution parameter αbrk (α=αbrk) at the time of a powered swing operation or at the time of a regenerative swing operation, respectively, thereby calculating the power distribution parameter α.

In a power distribution process 601 performed by the control switching unit 314, the battery output command Pb* and the assist F/F output command Paff* are calculated in accordance with the first battery output command Pb1* and first assist output command Pa1* calculated at the first control unit 311 and in keeping with the second battery output command Pb2* and second assist output command Pa2* calculated at the second control unit 312.

What follows hereunder is a detailed explanation of the power distribution process 601 performed by the control switching unit 314. As described above, the power distribution parameter α is a parameter for determining the electric power charged or discharged to or from the battery 27 when the swing electric motor 25 is in powering operation or in regenerative operation. Thus in the power distribution process 601, the battery output command Pb* and the assist F/F output command Paff* are calculated on the basis of the following mathematical expressions 4 and 5:

$$Pb^* = \alpha \cdot Pb1^* + (1-\alpha) \cdot Pb2^* \qquad \text{[Math. 4]}$$

$$Paff^* = \alpha \cdot Pa1^* + (1-\alpha) \cdot Pa2^* \qquad \text{[Math. 5]}$$

When the results from the mathematical expressions 1 and 2 are substituted into the mathematical expressions 4 and 5, mathematical expressions 6 and 7 below are obtained.

$$Pb^* = \alpha \cdot Psa^* \qquad \text{[Math. 6]}$$

$$Paff^* = -(1-\alpha) \cdot Psa^* \qquad \text{[Math. 7]}$$

As can be understood from the mathematical expressions 6 and 7 above, the swing assist output Psa* can be distributed between the battery output command Pb* and the assist F/F output command Paff* in accordance with the value of the power distribution parameter α.

As explained above, at the time of a powered swing operation, when the value of the battery state of charge SOC is high, the power distribution parameter α is configured to 1 so that the swing electric motor 25 in powering operation can be supplied with electric power from the capacitor 24 and battery 27. When the value of the battery state of charge SOC is low at the time of a powered swing operation, the power distribution parameter α is configured to 0 so that the swing electric motor 25 can be supplied with electric power from the capacitor 24 and assist generator motor 23.

Likewise, when the value of the battery state of charge SOC is high at the time of a regenerative swing operation, the power distribution parameter α is configured to zero so that the electric power regenerated through the swing electric motor 25 can be collected at the capacitor 24 and assist generator motor 23. Further, when the value of the battery state of charge SOC is low at the time of a regenerative swing operation, the power distribution parameter α is configured to 1 so that the electric power of the swing electric motor 25 can be collected at the capacitor 24 and battery 27.

Details of the processing performed by the engine revolution speed control unit 315 will now be explained with the use of FIG. 8. FIG. 8 is a control block diagram showing details of the processing performed by the engine revolution speed control unit constituting a part of the integrated controller in FIG. 3. The reference characters in FIG. 8 that are the same as those in FIGS. 1 through 7 refer to the same components, and these components will not be discussed further in detail.

The engine revolution speed control unit 315 estimates a delivery flow rate Qdp of the hydraulic pump 41 on the basis of the revolution speed Ne of the engine 22 detected at the ECM 57 and by use of predetermined flow rate characteristics of the hydraulic pump 41 or like factors. Also, on the basis of the delivery flow rate Qdp of the hydraulic pump 41 and the delivery pressure Pdp of the hydraulic pump 41 detected at the MCU 80, the engine revolution speed control unit 315 calculates the output Pp of the hydraulic pump 41 with the use of the predetermined flow rate characteristic of the hydraulic pump 41 or like factors. Further, the engine revolution speed control unit 315 calculates the output Pe demanded of the engine 22 with the use of a subtractor 700 subtracting the assist output command Pa* from the output Pp of the hydraulic pump 41.

Meanwhile, a combined operation determination part in the engine revolution speed control unit 315 determines whether there is a combined operation involving the swing structure 20 and the work machine 30 in accordance with the swing pilot pressure Pds and front pilot pressure Pdf. For example, if the swing pilot pressure Pds indicating status of the control lever 321 for operating the swing structure 20 is larger than a predetermined value, it is determined that the operator is carrying out a swing operation. If the front pilot pressure Pdf indicating status of the control lever 322 for operating the work machine 30 is larger than a predetermined value, it is determined that the operator is manipulating the work machine 30 (boom 31, arm 33, bucket 35). The combined operation determination part, when these conditions are all met, recognizes that the operator is performing a combined operation involving the swing structure 20 and the work machine 30 to set a combined operation determination flag (fSwgBmUp=1). If any one of the above conditions is not met, it is determined that there is no combined operation involving the swing structure 20 and the work machine 30, and the combined operation determination flag is then cleared (fSwgBmUp=0).

The engine revolution speed control unit 315 also has an engine revolution speed command calculation map 701 which, given the input of the above-mentioned engine demanded output Pe and combined operation determination flag fSwgBmUp, calculates the engine revolution speed command Ne*. Details of the engine revolution speed command calculation map 701 will be discussed later.

The engine revolution speed control unit 315 further uses a subtractor 702 to obtain a deviation eNe between the engine revolution speed command Ne* and the engine revolution speed Ne, and performs control to limit the output of the hydraulic pump 41 in accordance with the deviation eNe coming from the subtractor 702. It is determined, for example, that the hydraulic pump 41 is being overloaded when the engine revolution speed Ne gradually drops relative to the engine revolution speed command Ne* until the deviation eNe becomes larger than a predetermined value. The engine revolution speed control unit 315 then calculates the output command Pp* for the hydraulic pump 41 in such a manner as to make the deviation eNe smaller than the predetermined value, and outputs the pump output command Pp* to the MCU 80.

Details of the processing performed by the engine revolution speed command calculation map 701 are explained next with the use of FIGS. 9 and 10. FIG. 9 is a characteristic diagram showing details of the processing performed by the engine revolution speed command calculation map constituting a part of the engine revolution speed control unit in FIG. 8. FIG. 10 is a tabular view showing a method for setting the upper limits on the engine revolution speed with the use of the engine revolution speed command calculation map constituting a part of the engine revolution speed control unit. The reference characters in FIGS. 9 and 10 that are the same as those in FIGS. 1 through 8 refer to the same components, and these components will not be discussed further in detail.

In FIG. 9 the horizontal axis denotes the engine demanded output Pe and the horizontal axis represents the engine revolution speed command Ne*. A minimum engine output PeMin corresponds to the value obtained through the load for driving accessories such as an air conditioner added to a dragging loss of the hydraulic pump 41 in a standby state (in which no operation is performed by the operator). In this case the engine revolution speed command Ne* is set as a revolution speed NeMin at which the engine 22 can provide the minimum engine output PeMin.

A maximum engine output PeMax corresponds to the maximum output of the engine 22. The engine revolution speed command Ne* in this case is set as a revolution speed NeMax at which the engine 22 can provide the maximum engine output PeMax. Further, the engine revolution speed command calculation map 701 is in the form of a table established beforehand in accordance with the output characteristic of the engine 22. The engine revolution speed command Ne* is calculated and set in such a manner that fuel economy and exhaust performance are optimized with regard to the engine demanded output Pe.

Here, if the control switching unit 314 shown in FIG. 3 has selected those output command values for the battery 27 and assist generator motor 23 which were calculated at the first control unit 311, only the assist F/B output command Pafb* makes up the assist output command Pa* because the electric power for the swing electric motor 25 is shared by the capacitor 24 and battery 27. An engine demanded output Pe1 in this case is expressed by a mathematical expression 8 below, whereby the assist output command Pa* is subtracted from the output Pp of the hydraulic pump 41 as shown in FIG. 8.

$$Pe1 = Pp - Pa^* = Pp - Pafb^* \quad \text{[Math. 8]}$$

If the control switching unit 314 shown in FIG. 3 has selected those output command values for the battery 27 and assist generator motor 23 which were calculated at the second control unit 312, the assist output command Pa* is the assist F/B output command Pafb* plus the assist F/F output command Paff* (=−Psa*) because the electric power for the swing electric motor 25 is shared by the capacitor 24 and assist generator motor 23. An engine demanded output Pe2 in this case is expressed by the following mathematical expression 9:

$$Pe2 = Pp - Pa^* = Pp - (Paff^* + Pafb^*)$$

$$\therefore Pe2 = Pp + Psa^* - Pafb^* \quad \text{[Math. 9]}$$

Comparing the mathematical expression 8 with the mathematical expression 9 reveals that Psa*>0 when the swing electric motor 25 is in powering operation. Thus the engine demanded output Pe turns out to be higher and the engine revolution speed command Ne* calculated at the engine revolution speed command calculation map 701 is configured to be higher when those output command values for the battery 27 and assist generator motor 23 which were calculated at the second control unit 312 are selected, compared to when those output command values for the battery 27 and assist generator motor 23 which were calculated at the first control unit 311 are selected (Ne1<Ne2).

As explained above, where those output command values for the battery 27 and assist generator motor 23 which were calculated at the first control unit 311 are selected by the control switching unit 314 and where the swing electric motor 25 in powering operation is supplied with the electric power discharged by the capacitor 24 and battery 27, the engine revolution speed control unit 315 can control the engine revolution speed Ne at a first revolution speed (Ne1).

Further, where those output command values for the battery 27 and assist generator motor 23 which were calculated at the second control unit 312 are selected by the control switching unit 314 and where the swing electric motor 25 in powering operation is supplied with the electric power discharged by the capacitor 24 and regenerated through the assist generator motor 23, the engine revolution speed control unit 315 can control the engine revolution speed Ne at a second revolution speed (Ne2).

Furthermore, the engine revolution speed calculation map 701 has engine revolution speed upper limits NeLmt corresponding to the value of the combined operation determination flag. A method for setting the engine revolution speed upper limit NeLmt is explained below.

In FIG. 9, the output of the engine 22 necessary for the work machine (boom 31, arm 33, bucket 35) to individually operate is represented by PeHigh (<PeMax), and the engine revolution speed corresponding to this output is denoted by NeHigh (<NeMax). If the battery state of charge SOC is so high that the swing electric motor 25 in powering operation is supplied with the electric power discharged by the capacitor 24 and battery 27, the engine output necessary for the combined operation involving the swing structure 20 and work machine 30 is same as the engine output needed for the work machine 30 to operate singly.

Meanwhile, if the battery state of charge SOC is so low that the swing electric motor 25 in powering operation is supplied with the electric power discharged by the capacitor 24 and generated through the assist generator motor 23, the engine 22 drives the assist generator motor 23 for power generation. Thus the engine output necessary for the combined operation involving the swing structure 20 and work machine 30 becomes higher than the engine output PeHigh needed for the work machine 30 to operate singly.

Here, if the value of the assist F/B output command Pafb* changes due to control error or various disturbances, the value of the engine demanded output Pe varies as can be understood from the mathematical expressions 8 and 9. In this case, the engine demanded output Pe becomes higher than the engine output PeHigh needed for the work machine 30 to operate singly, so that it is necessary to increase the engine revolution speed command Ne* (>NeHigh). However, boosting the engine revolution speed results in a worsened fuel economy. To perform a fuel-efficient operation with the engine revolution speed held in check, it is preferred to set a predetermined upper limit on the engine revolution speed while performing pump output limitation (shown in FIG. 8) to adjust the output of the hydraulic pump 41 for the purpose of suppressing control error and various disturbances.

For example, if the battery state of charge SOC is high or the battery state of charge SOC is low without a combined operation underway involving the swing structure 20 and work machine 30, the engine revolution speed upper limit NeLmt is configured to NeHigh in order to limit the output of the engine 22 to the engine output PeHigh needed for the work machine 30 to individually operate, as shown in FIG. 10.

If the battery state of charge SOC is low while a combined operation involving the swing structure 20 and work machine 30 is underway, the engine revolution speed upper limit NeLmt is configured to NeMax to let the engine 22 provide its maximum output PeMax.

In this manner, the combined operation involving the swing structure 20 and work machine 30 is determined in keeping with the operating status of the control levers (control devices) 321 and 322 for operating the swing structure 20 and the work machine 30. Where the upper limit on the engine revolution speed is set in accordance with such determination, the engine revolution speed can be raised to ensure the engine output needed to drive the hydraulic pump 41 only if the battery state of charge SOC is low and if the swing electric motor 25 in powering operation is supplied with the electric power discharged by the capacitor 24 and regenerated through the assist generator motor 23. In other cases, a fuel-efficient operation can be brought about by suppressing the increase in the engine revolution speed.

Explained next with the use of FIGS. 11 and 12 are methods for controlling one embodiment of the present invention in the form of a hybrid construction machine and a method for controlling that machine. FIG. 11 is a timing chart showing a method for controlling a swing operation with one embodiment of the present invention in the form of a hybrid construction machine and a method for controlling that machine. FIG. 12 is a timing chart showing a method for controlling an excavating operation with one embodiment of the present invention in the form of a hybrid construction machine and a method for controlling that machine. The reference characters in FIGS. 11 and 12 that are same as those in FIGS. 1 through 10 refer to the same components, and these components will not be discussed further in detail.

First, the method for controlling the swing operation is explained with the use of FIG. 11. In FIG. 11, the horizontal axis denotes time. On the vertical axis in the figure, reference character (a) stands for the output Ps of the swing electric motor 25, (b) for the output Pa of the assist generator motor 23, (c) for the output Pc of the capacitor 24, (d) for the output Pb of the battery 27, (e) for the output Pe demanded of the engine 22, (f) for the revolution speed Ne of the engine 22, (g) for the voltage Vc of the capacitor 24, and (h) for the state of charge SOC of the battery 27. The solid lines denote the controlling method used when the battery state of charge SOC is high (70% or higher), and dotted lines represent the controlling method used when the battery state of charge SOC is low (30% or lower).

First, the controlling method used when the battery state of charge SOC is high (70% or higher) is explained.

At time t1 at which the operator operates the swing control lever 321 in the accelerating direction, the powering output (Ps>0) of the swing electric motor 25 is raised to accelerate the swing structure 20 (powered swing operation). At this point, the battery state of charge SOC in FIG. 11(*h*) is so high that the battery output Pb gradually rises up to the swing assist output Psa* (=cPsaHigh) calculated at the capacitor voltage control unit 302 as shown in FIG. 11(*d*). The battery state of charge SOC, meanwhile, gradually drops.

At time t2 at which the battery output Pb in FIG. 11(*d*) reaches the swing assist output Psa*, the DC voltage control unit 301 gradually raises the discharge output (Pc>0) of the capacitor 24 to compensate for a drop in the swing electric motor output Ps, as shown FIG. 11(*c*). At this point, the swing electric motor 25 in powering operation is supplied with the electric power discharged by both the capacitor 24 and the battery 27 in a shared manner. The capacitor voltage Vc and the battery state of charge SOC hence gradually drop. In addition, the engine revolution speed Ne is kept to the minimum revolution speed NeMin since the engine demanded output Pe does not increase.

At time t3 at which the operator operates the swing control lever 321 in the decelerating direction, the swing electric motor output Ps in FIG. 11(*a*) is switched to the regenerating direction (Ps<0), and the swing structure 20 is decelerated accordingly (regenerative swing operation). At this point, the battery state of charge SOC is high, and the battery output Pb in FIG. 11(d) is limited to zero, whereby the powering output (Pa>0) of the assist generator motor 23 is raised up to the value obtained through inversion of the swing assist output Psa* calculated at the capacitor voltage control unit 302 (= (−1)×cPsaLow).

As a result of the powering output of the assist generator motor 23, the engine demanded output Pe drops. The DC voltage control unit 301 switches the capacitor output Pc in FIG. 11(c) to the charging direction (Pc<0) so as to compensate for a decline in the swing electric motor output Ps. As the swing structure 20 decelerates, the regenerated output (Ps<0) of the swing electric motor 25 gradually drops and the charge output (Pc<0) of the capacitor 24 gradually decreases. At this point, the regenerated output of the swing electric motor 25 is shared by the capacitor 24 in charging and by the assist generator motor 23 in powering. The capacitor voltage Vc then gradually increases.

At time t4 at which the regenerated output of the swing electric motor 25 becomes high enough to cover the powering output of the assist generator motor 23, the capacitor output Pc in FIG. 11(c) becomes zero. As the regenerated output of the swing electric motor 25 drops, the powering output of the assist generator motor 23 gradually decreases. Later at time t5 at which the swing structure 20 stops, the swing electric motor output Ps in FIG. 11(a) and the assist generator motor output Pa in FIG. 11(b) both become zero, and the swing operation is terminated.

The controlling method used when the battery state of charge SOC is low (30% or lower) will next be explained.

At time t1 at which the operator operates the swing control lever 321 in the accelerating direction, the powering output (Ps>0) of the swing electric motor 25 is raised as shown in FIG. 11(a) and the swing structure 20 is accelerated accordingly (powered swing operation). At this point, the battery state of charge SOC is so low that the battery output Pb in FIG. 11(d) is limited to zero, whereby the generated output (Pa>0) of the assist generator motor 23 in FIG. 11(b) is gradually raised to the value obtained through inversion of the swing assist output Psa* calculated at the capacitor voltage control unit 302 (=(−1)×cPsaHigh). Thus the engine demanded output Pe in FIG. 11(e) increases to drive the assist generator motor 23 for power generation, and the engine revolution speed Ne in FIG. 11(f) gradually boosts (NeMin→NeSwg).

At time t2 at which the assist generator motor output Pa reaches the value obtained through inversion of the swing assist output Psa* as shown in FIG. 11(d), the DC voltage control unit 301 gradually increases the discharge output (Pc>0) of the capacitor 24 to compensate for a drop in the swing electric motor output Ps as shown in FIG. 11(c). At this point, the swing electric motor 25 in powering operation is supplied with the electric power both discharged by the capacitor 24 and generated through the assist generator motor 23 in a shared manner, and the capacitor voltage Vc gradually declines. In addition, the engine revolution speed Ne is maintained at the engine revolution speed NeSwg in powered swing operation since the engine demanded output Pe is increasing.

At time t3 at which the operator operates the swing control lever 321 in the decelerating direction, the swing electric motor output Ps in FIG. 11(a) is switched to the regenerating direction (Ps<0), and the swing structure 20 is decelerated accordingly (regenerative swing operation). At this point, the battery state of charge SOC is so low that the assist generator motor output Pa in FIG. 11(b) is limited to zero, whereby the charge output (Pb<0) of the battery 27 in FIG. 11(d) is raised to the swing assist output Psa* (=cPsaLow) calculated at the capacitor voltage control unit 302. This eliminates the need to drive the assist generator motor 23 for power generation, and therefore, the engine demanded output Pe decreases and the engine revolution speed Ne falls (NeSwg→NeMin).

Also, in order to compensate for a drop in the swing electric motor output Ps, the DC voltage control unit 301 switches the capacitor output Pc in FIG. 11(c) to the charging direction (Pc<0). As the swing structure 20 decelerates, the regenerated output (Ps<0) of the swing electric motor 25 gradually drops and the charge output (Pc<0) of the capacitor 24 gradually decreases. At this point, the regenerated power of the swing electric motor 25 is shared by the capacitor 24 and battery 27 in charging. The capacitor voltage Vc and the battery state of charge SOC thus gradually increase.

At time t4 at which the regenerated output of the swing electric motor 25 becomes high enough to cover the charge output of the battery 27, the capacitor output Pc in FIG. 11(c) becomes zero, and the charge output of the battery 27 gradually drops as the regenerated output of the swing electric motor 25 decreases. Later at time t5 at which the swing structure 20 stops, the swing electric motor output Ps in FIG. 11(a) and the battery output Pb in FIG. 11(d) both become zero. The swing operation is thus terminated.

As explained above, the hydraulic excavator embodying the present invention switches a first control mode and a second control mode back and forth in accordance with the battery state of charge SOC, the first control mode being a mode in which the battery 27 supplies electric power to the swing electric motor 25 performing powering operation, the second control mode being a mode in which the electric power generated through the assist generator motor 23 driven by the engine 22 for power generation is supplied to the swing electric motor 25 performing powering operation. When the first control mode is selected, the engine revolution speed Ne is controlled at the first revolution speed (NeMin); when the second control mode is selected, the engine revolution speed Ne is controlled at the second revolution speed (NeSwg) higher than the first revolution speed (NeMin).

The method for controlling the hybrid construction machine of the present invention in excavating operation will now be explained with the use of FIG. 12. The excavating operation is a combined operation in which the work machine 30 such as the boom 31, arm 33, and bucket 35 is first operated to carry out excavation work, followed by the boom 31 being raised as the swing structure is being accelerated in preparation for excavated soil to be loaded into a dump truck. Thereafter, with the swing structure 20 being decelerated, the bucket 35 is operated to drop the soil into the dump truck.

In FIG. 12, the horizontal axis denotes time. On the vertical axis in the figure, reference character (a) stands for the output Ps of the swing electric motor 25, (b) for the output Pa of the assist generator motor 23, (c) for the output Pc of the capacitor 24, (d) for the output Pb of the battery 27, (e) for the output Pe demanded of the engine 22, (f) for the revolution speed Ne of the engine 22, (g) for the voltage Vc of the capacitor 24, and (h) for the state of charge SOC of the battery 27. The solid lines denote the controlling method used when the battery state of charge SOC is high (70% or higher), and dotted lines represent the controlling method used when the battery state of charge SOC is low (30% or lower).

The controlling method used when the battery state of charge SOC is high (70% or higher) is first explained.

At time t0 the operator starts excavation by operating the control lever 322 to activate the work machine 30 (boom 31, arm 33, bucket 35). The output Pp of the hydraulic pump 41 then rises, which boosts the engine demanded output Pe in FIG. 12(e) up to the engine output PeHigh needed for the work machine 30 to individually operate. The engine revolution speed Ne in FIG. 12(f) is raised to the revolution speed NeHigh corresponding to that engine output.

At time t1 at which excavation is terminated, the operator operates the control lever 322 simultaneously with operating the swing control lever 321 in the accelerating direction in preparation for excavated soil to be loaded into the dump truck, whereby the boom 31 is raised while the swing structure 20 is being accelerated (powered swing, boom raising). Then as shown in FIG. 12(a), the powering output (Ps>0) of the swing electric motor 25 rises to accelerate the swing structure 20 and the output Pp of the hydraulic pump 41 increases at the same time, whereby the engine demanded output Pe in FIG. 12(e) is maintained at the engine output PeHigh needed for the work machine 30 to operate singly. The engine revolution speed Ne in FIG. 12(f) is also maintained at the revolution speed NeHigh corresponding to that engine output.

At this point, the battery state of charge SOC in FIG. 12(h) is so high that the battery output Pb gradually increases to the swing assist output Psa* (=cPsaHigh) calculated at the capacitor voltage control unit 302 as shown in FIG. 12(d). The battery state of charge SOC then gradually declines.

At time t2 at which the battery output Pb reaches the swing assist output Psa* as shown in FIG. 12(d), the DC voltage control unit 301 gradually raises the discharge output (Pc>0) of the capacitor 24 to compensate for a drop in the swing electric motor output Ps, as shown FIG. 12(c). At this point, the swing electric motor 25 in powering operation is supplied with the electric power discharged by both the capacitor 24 and the battery 27 in a shared manner. The capacitor voltage Vc in FIG. 12(g) and the battery state of charge SOC in FIG. 12(h) gradually drop. The output of the engine 22 necessary for driving the hydraulic pump 41 is ensured since the engine revolution speed Ne in FIG. 12(f) is maintained at the revolution speed NeHigh corresponding to the engine output PeHigh needed for the work machine 30 to operate singly.

Later at time t3, the operator operates the swing control lever 321 in the decelerating direction simultaneously with operating the control lever 322, thereby rotating the bucket 35 while decelerating the swing structure 20 to drop the excavated soil into the dump truck (regenerative swing, soil dropping). Then the swing electric motor output Ps in FIG. 12(a) is switched to the regenerating direction (Ps<0), and the swing structure 20 is decelerated accordingly. At this point, the battery state of charge SOC is so high that the battery output Pb in FIG. 12(d) is limited to zero, whereby the powering output (Pa>0) of the assist generator motor 23 is raised up to the value obtained through inversion of the swing assist output Psa* calculated at the capacitor voltage control unit 302 (=(-1)×cPsaLow).

Whereas the output Pp of the hydraulic pump 41 is needed as a result of the rotation of the bucket 35, the powering output of the assist generator motor 23 causes the engine demanded output Pe to drop below the engine output PeHigh necessary for the work machine 30 to individually operate. Thus the engine revolution speed Ne becomes lower than the revolution speed NeHigh corresponding to that engine output.

The DC voltage control unit 301 also switches the capacitor output Pc in FIG. 12(c) to the charging direction (Pc<0) in order to compensate for a drop in the swing electric motor output Ps. As the swing structure 20 decelerates, the regenerated output (Ps<0) of the swing electric motor 25 gradually drops and the charge output (Pc<0) of the capacitor 24 gradually decreases. At this point, the regenerated power of the swing electric motor 25 is shared by both the capacitor 24 in charging and the assist generator motor 23 in powering, and the capacitor voltage Vc then gradually increases.

At time t4 at which the regenerated output of the swing electric motor 25 becomes high enough to cover the powering output of the assist generator motor 23, the capacitor output Pc in FIG. 12(c) becomes zero, and the powering output of the assist generator motor 23 gradually drops as the regenerated output of the swing electric motor 25 decreases.

Later at time t5 at which the swing structure 20 stops and the operation of the bucket 35 is completed, the swing electric motor output Ps in FIG. 12(a) and the assist generator motor output Pa in FIG. 12(b) both become zero. The engine revolution speed Ne in FIG. 12(f) is thus lowered to the minimum revolution speed NeMin and the excavating operation is terminated because the engine demanded output Pe in FIG. 12(e) is reduced to the minimum output PeMin.

The controlling method used when the battery state of charge SOC is low (30% or lower) will now be explained.

At time t0 the operator starts excavation by operating the control lever 322 to activate the work machine 30 (boom 31, arm 33, bucket 35). The output Pp of the hydraulic pump 41 then increases, which raises the engine demanded output Pe in FIG. 12(e) up to the engine output PeHigh needed for the work machine 30 to individually operate. The engine revolution speed Ne in FIG. 12(f) rises to the revolution speed NeHigh corresponding to that engine output.

At time t1 at which excavation is terminated, the operator operates the control lever 322 simultaneously with operating the swing control lever 321 in the accelerating direction in preparation for excavated soil to be loaded into the dump truck, whereby the boom 31 is raised while the swing structure 20 is being accelerated (powered swing, boom raising). Then as shown in FIG. 12(a), the powering output (Ps>0) of the swing electric motor 25 is raised to accelerate the swing structure 20 and the output Pp of the hydraulic pump 41 simultaneously increases.

At this point, the battery state of charge SOC is low as shown in FIG. 12(h). Thus the battery output Pb in FIG. 12(d) is limited to zero, and the generated output (Pa<0) of the assist generator motor 23 is gradually raised to the value obtained through inversion of the swing assist output Psa* calculated at the capacitor voltage control unit 302 (=(-1)×cPsaHigh). When the engine 22 is used to drive the assist generator motor 23 for power generation while ensuring the output Pp of the hydraulic pump 41 in this manner, the engine demanded output Pe in FIG. 12(e) is gradually raised to the maximum output PeMax (>PeHigh). The engine revolution speed Ne in FIG. 12(f) is gradually increased to the revolution speed NeMax corresponding to that maximum output.

At time t2 at which the assist generator output Pa reaches the value obtained through inversion of the swing assist output Psa* as shown in FIG. 12(b), the DC voltage control unit 301 gradually raises the discharge output (Pc>0) of the capacitor 24 to compensate for a drop in the swing electric motor output Ps, as shown in FIG. 12(c). At this point, the swing electric motor 25 in powering operation is supplied with the electric power both discharged by the capacitor 24 and generated through the assist generator motor 23 in a shared manner. The capacitor voltage Vc gradually drops as a result.

In addition, the output of the engine 22 needed to drive the hydraulic pump 41 is ensured since the engine revolution speed Ne in FIG. 12(f) is raised to the revolution speed NeMax corresponding to the maximum output PeMax.

Later at time t3, the operator operates the swing control lever 321 in the decelerating direction simultaneously with operating the control lever 322, thereby rotating the bucket 35 while decelerating the swing structure 20 to drop the excavated soil into the dump truck (regenerative swing, soil dropping). The swing electric motor output Ps in FIG. 12(a) is then switched to the regenerating direction (Ps<0), and the swing structure 20 is decelerated accordingly (regenerative swing).

At this point, the battery state of charge SOC is so low that the assist generator motor output Pa in FIG. 12(b) is limited to zero, whereby the charge output (Pb<0) of the battery 27 increases up to the swing assist output Psa* (=cPsaLow) calculated at the capacitor voltage control unit 302.

Whereas the output Pp of the hydraulic pump 41 is needed as a result of the rotation of the bucket 35, the generated output of the assist generator motor 23 becomes zero. Thus the engine demanded output Pe in FIG. 12(e) drops to the engine output PeHigh required for the work machine 30 to operate singly. The engine revolution speed Ne in FIG. 12(f) declines to the revolution speed NeHigh corresponding to that engine output.

The DC voltage control unit 301 also switches the capacitor output Pc in FIG. 12(c) to the charging direction (Pc<0) in order to compensate for a drop in the swing electric motor output Ps. As the swing structure 20 decelerates, the regenerated output (Ps<0) of the swing electric motor 25 gradually drops and the charge output (Pc<0) of the capacitor 24 gradually decreases. At this point, the regenerated power of the swing electric motor 25 is shared by both the capacitor 24 and the battery 27 in charging, so that the capacitor voltage Vc and the battery state of charge SOC gradually increase.

At time t4 at which the regenerated output of the swing electric motor 25 becomes high enough to cover the charge output of the battery 27, the capacitor output Pc in FIG. 12(c) becomes zero, and the charge output of the battery 27 gradually drops as the regenerated output of the swing electric motor 25 decreases. Later at time t5 at which the swing structure 20 stops and the rotation of the bucket 35 is completed, the swing electric motor output Ps in FIG. 12(a) and the assist generator motor output Pa in FIG. 12(b) both become zero. The engine revolution speed Ne in FIG. 12(f) declines to the minimum revolution speed NeMin and the excavating operation is terminated because the engine demanded output Pe in FIG. 12(e) drops to the minimum output PeMin.

As explained above, the hydraulic excavator as one embodiment of the present invention switches a first control mode and a second control mode back and forth in accordance with the battery state of charge SOC, the first control mode being a mode in which the battery 27 supplies electric power to the swing electric motor 25 performing powering operation, the second control mode being a mode in which the electric power generated through the assist generator motor 23 driven by the engine 22 for power generation is supplied to the swing electric motor 25 performing powering operation. When the first control mode is selected, the engine revolution speed Ne is controlled at the first revolution speed (NeHigh); when the second control mode is selected and a combined operation involving the work machine 30 and the swing structure 20 is underway, the engine revolution speed Ne is controlled at the second revolution speed (NeMax) higher than the first revolution speed (NeHigh).

According to the above-described embodiment of the present invention in the form of a hybrid construction machine and a method for controlling that machine, at the time of a combined operation involving the swing structure 20 operating in combination with the work machine 30 attached to that structure, the swing electric motor 25 is supplied with electric power from the battery 27 (an electric storage device having a low output level and a high stored energy level per unit weight) and from the capacitor 24 (an electric storage device having a high output level and a low stored energy level per unit weight), and the output of the hydraulic pump 41 is controlled in keeping with the power of the engine 22. This makes it possible suitably to provide the electric power for driving the swing structure 20 and the power for driving the hydraulic pump 41. As a result, at the time of a swing boom raising operation as a combined operation involving the swing structure 20 and the work machine 30 attached thereto, a good balance is maintained between the swing speed of the swing structure 20 and the raising speed of the boom 31. This ensures the operability of combined operations performed by the hybrid construction machine.

Also according to the above-described embodiment of the present invention in the form of a hybrid construction machine and a method for controlling that machine, the battery 27 supplies electric power to the swing electric motor 25 in order to lower the engine revolution speed when the battery state of charge is not low. This maximizes the advantage of reducing fuel consumption while the battery is in use. When the battery state of charge is low, the power of the engine 22 is used to drive the assist generator motor 23 for power generation, whereby the swing electric motor 25 is supplied with electric power and the engine revolution speed is raised. This makes it possible to minimize constraints on the power of the hydraulic pump 41.

Further according to the above-described embodiment of the present invention in the form of a hybrid construction machine and a method for controlling that machine, the first control mode can be switched to the second control mode when the battery state of charge is low, the first mode being a mode in which the swing electric motor 25 in powering operation is supplied with the electric power discharged by both the capacitor 24 and the battery 27 in a shared manner, the second control mode being a mode in which the swing electric motor 25 in powering operation is supplied with the electric power both discharged by the capacitor 24 and generated through the assist generator motor 23 driven by the engine 22 for power generation. In this case, the power distribution process 601 of the control switching unit 314 switches linearly the output command values for the battery 27 and assist generator 23 in accordance with the distribution parameter α on the basis of the battery state of charge SOC, which enables the controlling methods to change smoothly.

Also according to the above-described embodiment of the present invention in the form of a hybrid construction machine and a method for controlling that machine, the output command values for the battery 27 and assist generator motor 23 are calculated to suppress any difference in the output Pc of the capacitor 24 between the first control mode and the second control mode, so that the voltage Vc of the capacitor 24 becomes substantially the same between the two modes. As a result, design versatility of the construction machine can be ensured in such a manner that the battery 27 is provided as a plug-in component, for example, while the capacitor 24 having a higher output level and a lower stored energy level per unit weight than the battery 27 is suitably utilized.

Further according to the above-described embodiment of the present invention in the form of a hybrid construction machine and a method for controlling that machine, the engine revolution speed Ne is controlled in a low revolution speed range (up to NeHigh) in the first control mode in which the swing electric motor 25 in powering operation is supplied with the electric power discharged by both the capacitor 24 and the battery 27 in a shared manner. This enhances the advantage of reducing fuel consumption when the battery 27 is being used.

Also according to the above-described embodiment of the present invention in the form of a hybrid construction machine and a method for controlling that machine, the engine revolution speed Ne is controlled in a high revolution speed range (up to NeMax) in the second control mode in which the swing electric motor 25 in powering operation is supplied with the electric power both discharged by the capacitor 24 and generated through the assist generator motor 23 driven by the engine 22 for power generation. The engine output necessary for driving the hydraulic pump 41 is hence secured even when the battery state of charge SOC decreases.

Reference Numerals
10 Track structure
20 Swing Structure
22 Engine
23 Assist generator motor (first electric motor)
24 Capacitor
25 Swing electric motor (second electric motor)
27 Battery
30 Work machine
31 Boom
41 Hydraulic pump
42 Control valve
100 Integrated controller
311 First control unit
312 Second control unit
313 Battery state-of-charge estimation unit
314 Control switching unit
315 Engine revolution speed control unit

The invention claimed is:

1. A hybrid construction machine comprising:
 a swing structure;
 a work machine attached to the swing structure;
 an engine mounted on the swing structure;
 a first electric motor driven by the engine, the motor being capable of generating power;
 a hydraulic pump driven by the engine and the first electric motor;
 a hydraulic actuator which drives and operates the work machine by use of power generated through the hydraulic pump;
 a second electric motor for driving the swing structure; and
 a plurality of electric storage devices for supplying electric power to drive the first electric motor and the second electric motor and for being charged with electric power generated through the first electric motor and the second electric motor, wherein
  the hybrid construction machine further includes:
   a first control unit which, in a combined operation involving the work machine and the swing structure, drives and controls the second electric motor by use of the electric power supplied from at least the first electric storage device selected from the storage devices and from a second electric storage device selected from the storage devices offering a higher electric power level and a lower stored energy level per unit weight than the first electric storage device, and drives and controls the hydraulic pump by use of the engine.

2. The hybrid construction machine according to claim 1, further comprising:
 a second control unit which drives and controls the second electric motor by use of the electric power generated through the first electric motor driven by the engine for power generation and the electric power coming from the electric storage device offering the higher electric power level and the lower stored energy level per unit weight than the selected at least one electric storage device, and
 a control switching unit which switches between the first control unit and the second control unit in accordance with a state of charge of the electric storage device selected at the first control unit.

3. The hybrid construction machine according to claim 2, further comprising:
 an engine revolution speed control unit which controls the engine revolution speed of the engine at a first revolution speed when the first control unit is selected, and at a second revolution speed higher than the first revolution speed when the second control unit is selected.

4. A method for controlling a hybrid construction machine having:
 a swing structure;
 a work machine attached to the swing structure;
 an operating device for operating the swing structure and the work machine;
 an engine mounted on the swing structure;
 a first electric motor driven by the engine, the motor being capable of generating power;
 a hydraulic pump driven by the engine and by the first electric motor;
 a hydraulic actuator which drives and operates the work machine by use of power generated through the hydraulic pump;
 a second electric motor for driving the swing structure; and
 a plurality of electric storage devices for supplying electric power to drive the first electric motor and the second electric motor and for being charged with electric power generated through the first electric motor and the second electric motor, the method including a first control mode for executing:
 a first step of determining whether a combined operation involving the work machine and the swing structure in accordance with an operating status of the operating device is present or absent;
 a second step which, if the first step determines that the combined operation involving the work machine and the swing structure is present, drives the second electric motor by use of the electric power supplied from at least the first electric storage device selected from the plurality of storage devices and from the second electric storage device selected from the plurality of storage devices offering a higher electric power level and a lower stored energy level per unit weight than the first electric storage device, and
 a third step of driving and controlling the hydraulic pump by use of the engine.

5. The method for controlling the hybrid construction machine according to claim 4, further comprising:
 a second control mode in which the second electric motor is driven and controlled with the electric power generated through the first electric motor driven by the engine for power generation and supplied from the electric storage device offering the higher electric power level and the lower stored energy level per unit weight than that of at least one electric storage device selected in the first control mode, wherein
 the first and the second control modes are switched back and forth in accordance with state of charge of the electric storage device selected in the first control mode.

6. The method for controlling the hybrid construction machine according to claim 5, wherein the engine revolution speed is controlled at a first revolution speed when the first control mode is selected, and at a second revolution speed higher than the first revolution speed when the second control mode is selected.

* * * * *